United States Patent
Rottenstreich et al.

(10) Patent No.: US 9,465,619 B1
(45) Date of Patent: Oct. 11, 2016

(54) SYSTEMS AND METHODS FOR SHARED PIPELINE ARCHITECTURES HAVING MINIMALIZED DELAY

(71) Applicant: Marvell Israel (M.I.S.L) Ltd., Yokneam (IL)

(72) Inventors: Ori Rottenstreich, Kiriat Motzkin (IL); Yoram Revah, Akko (IL); Aviran Kadosh, D.N. Misgav (IL)

(73) Assignee: MARVELL ISRAEL (M.I.S.L) LTD., Yokneam (IL)

( * ) Notice: Subject to any disclaimer, the term of this patent is extended or adjusted under 35 U.S.C. 154(b) by 396 days.

(21) Appl. No.: 14/090,698

(22) Filed: Nov. 26, 2013

Related U.S. Application Data (60) Provisional application No. 61/731,221, filed on Nov. 29, 2012.

(51) Int. Cl.
*G06F 9/38* (2006.01)

(52) U.S. Cl.
CPC .................. *G06F 9/3885* (2013.01)

(58) Field of Classification Search
None
See application file for complete search history.

(56) References Cited

U.S. PATENT DOCUMENTS

| | | | | |
|---|---|---|---|---|
| 5,640,106 A * | 6/1997 | Erickson | ............. | G06F 17/5054 326/38 |
| 7,434,191 B2 * | 10/2008 | Vorbach | ............. | G06F 9/30036 716/138 |
| 7,626,986 B1 * | 12/2009 | Tse-Au | ................... | H04L 49/45 370/389 |
| 8,519,739 B1 * | 8/2013 | Leon | ................... | G06F 15/7867 326/38 |
| 8,806,181 B1 * | 8/2014 | O'Bleness | ............ | G06F 9/3869 712/228 |
| 2005/0039167 A1 * | 2/2005 | Fernandes | ............. | G06F 8/4441 717/116 |
| 2006/0200651 A1 * | 9/2006 | Collopy | ................ | G06F 9/3836 712/220 |
| 2009/0138892 A1 * | 5/2009 | Almasi | ................. | G06F 13/387 719/313 |
| 2011/0213947 A1 * | 9/2011 | Mathieson | ............... | G06F 1/206 712/16 |
| 2011/0225334 A1 * | 9/2011 | Byrne | ................. | G06F 13/4027 710/110 |
| 2011/0231616 A1 * | 9/2011 | Lin | ........................ | G06F 9/3828 711/147 |
| 2011/0314255 A1 * | 12/2011 | Krishna | ............ | G06F 15/17337 712/16 |

* cited by examiner

Primary Examiner — Eric Coleman (57) ABSTRACT

Systems and methods are provided for a multi-core processor for processing different types of data units. A system includes a classifier configured to classify incoming data units into different type data units. A plurality of processing cores are selectably configurable into plural processing pipelines, respective processing pipelines including connected processing cores, ones of the processing cores being selectably programmed to execute a respective processing operation on a received incoming data unit, different ones of the processing pipelines defined by a selectable number of processing cores. A distributor is configured to distribute the different types of data units to one of the pipelines among the plural pipelines at least as a function of the classified type of the data units and the programmed processing operations of processing cores in the pipelines.

18 Claims, 6 Drawing Sheets

SYSTEMS AND METHODS FOR SHARED PIPELINE ARCHITECTURES HAVING MINIMALIZED DELAY

CROSS-REFERENCE TO RELATED APPLICATIONS

The present application claims priority from U.S. Provisional Application Ser. No. 61/731,221 entitled "Shared Pipeline Architectures Having Minimalized Delay," filed 29 Nov. 2012, the entirety of which is hereby incorporated by reference.

FIELD

This disclosure is related generally to network data processing and more particularly to processing of network data in a pipelined processor.

BACKGROUND

In a pipeline processing architecture, tasks to be performed on a data unit are broken into component operations. A pipeline processor includes of a number of hardware or software processing entities, where each processing entity is configured to perform one or more of the component operations and to pass a data unit to a next processing entity upon completion of a component operation. Thus, a first processing entity in a pipeline passes the results from performing its component operation on a first data unit to a downstream processing entity in the pipeline. The first processing entity then begins performing its component operation on a second data unit while the downstream processing entity operates on the results received from the first processing entity. In this manner, with different data units being simultaneously processed at different processing entities in the pipeline, at any given time the pipeline operates on multiple data units that are passing through the pipeline. Consequently, because each data unit is passed through every processing entity in the pipeline, each data unit is processed in the pipeline for the same amount of time regardless of its actual processing requirement.

The description above is presented as a general overview of related art in this field and should not be construed as an admission that any of the information it contains constitutes prior art against the present patent application.

SUMMARY

Systems and methods are provided for a multi-core processor for processing different types of data units. A system includes a classifier configured to classify incoming data units into different type data units. A plurality of processing cores are selectably configurable into plural processing pipelines, respective processing pipelines including connected processing cores, ones of the processing cores being selectably programmed to execute a respective processing operation on a received incoming data unit, different ones of the processing pipelines defined by a selectable number of processing cores. A distributor is configured to distribute the different types of data units to one of the pipelines among the plural pipelines at least as a function of the classified type of the data units and the programmed processing operations of processing cores in the pipelines.

As another example, a method of processing different types of data units using a multi-core processor includes a step of classifying an incoming data unit into one of a plurality of different types. The incoming data unit is distributed to one of a plurality of processing pipelines comprising a plurality of connected processing cores, each processing core being selectably programmed to execute a respective processing operation, the incoming data unit being assigned based on processing operations that are to be performed on the incoming data unit and the programmed processing operations of processing cores in the pipelines.

DETAILED DESCRIPTION

In one embodiment of the disclosure, a multi-core processor receives data units of differing types from a network. The multi-core processor is configured to perform different sets of processing operations on received data units based on the type of the data unit. In one example, the multi-core processor is configured to perform a first operation and a second operation on a data unit of a first type, while the multi-core processor is configured to perform the first operation, a third operation, and a fourth operation on a data unit of a second type. Such processing is achieved, in one embodiment, using a pipeline architecture having individual processing cores configured to perform individual operations.

Because different data units may require different processing operations to be performed for complete processing, a fastest average processing speed for data units in such a pipeline architecture is typically achievable by providing dedicated pipelines for each type of data unit that requires a different set of processing operations to be performed (i.e., a first pipeline having a first operation processing core and a second operation processing core for processing data units of the first type; and a second pipeline having a first operation processing core, a third operation processing core, and a fourth operation processing core for processing data units of the second type). The speed achieved in such a data unit type dedicated pipeline configuration is often overshadowed by the expense of designating a processing core for each operation of each data type, especially when there is overlap of operations to be performed across two or more data unit types. Thus, in some embodiments, processing cores allocated to pipelines are configured to operate on multiple types of data units.

Figure 1:
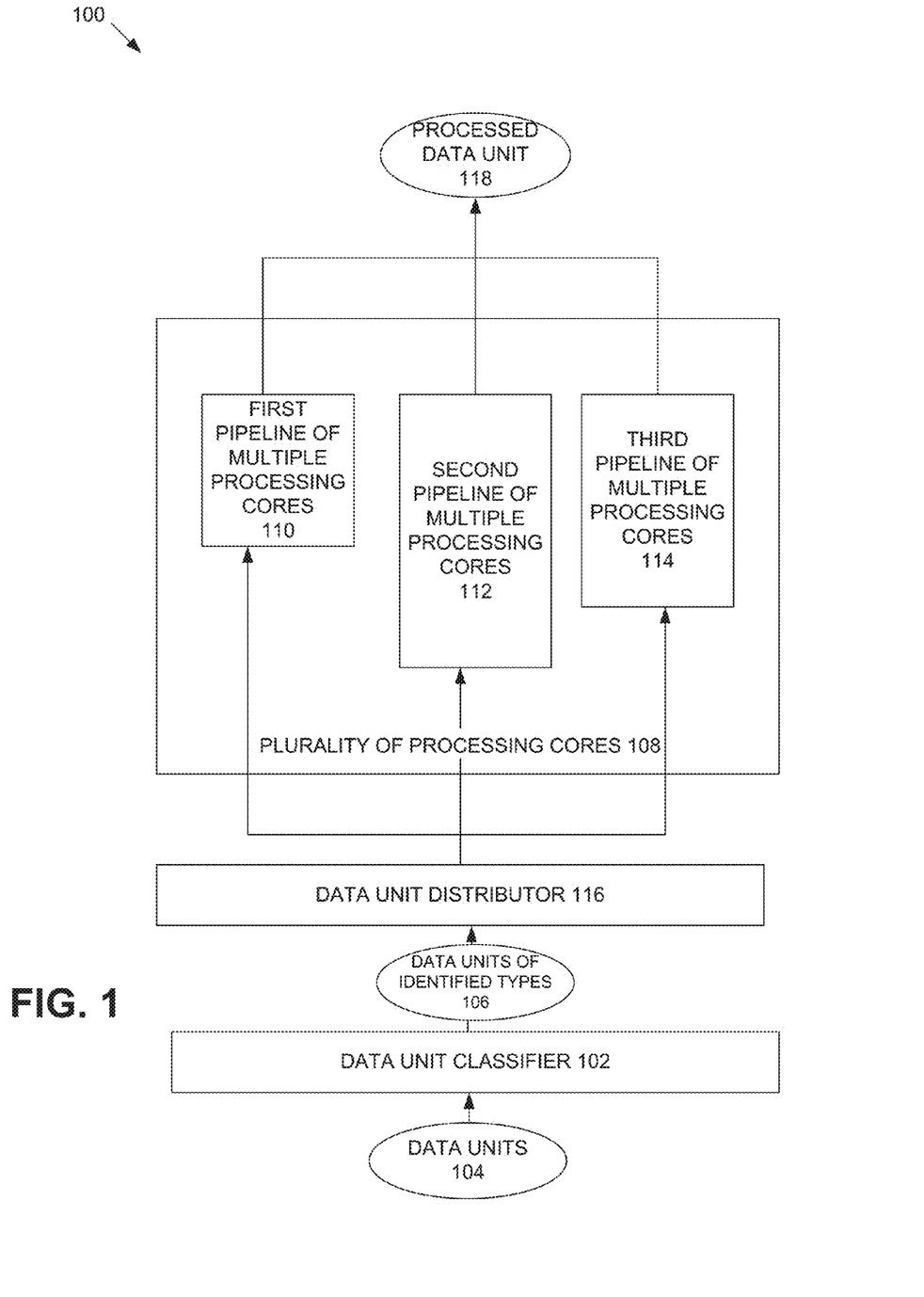
FIG. 1 is a block diagram depicting a multi-core processor for processing different types of data units.

FIG. 1 is a block diagram depicting a multi-core processor 100 for processing different types of data units. A data unit classifier 102 is configured to classify incoming data units 104 into different types of data units 106. The multi-core processor 100 includes a plurality of processing cores 108 that are selectably configurable into plural processing pipelines 110, 112, 114. Each of the pipelines 110, 112, 114 includes a number of connected processing cores, where each of the processing cores is selectively programmed to execute a respective processing operation on a received incoming data unit 104. Different ones of the processing pipelines 110, 112, 114 have different numbers of processing cores, such that the processing operations to be formed in a processing pipeline 110 are tailored for the processing requirements of a type of data unit to be processed at the processing pipeline 110. The multi-core processor further includes a distributor 116 configured to distribute the different types of data units 106 to one of the pipelines among the plural pipelines 110, 112, 114 at least as a function of the classified type of the data units and the programmed processing operations of processing cores in the pipelines 110, 112, 114. A typed data unit 106 is assigned to one of the pipelines 110, 112, 114 by the distributor 116, and the typed unit is processed by that pipeline to output a processed data unit 118.

Figure 2:
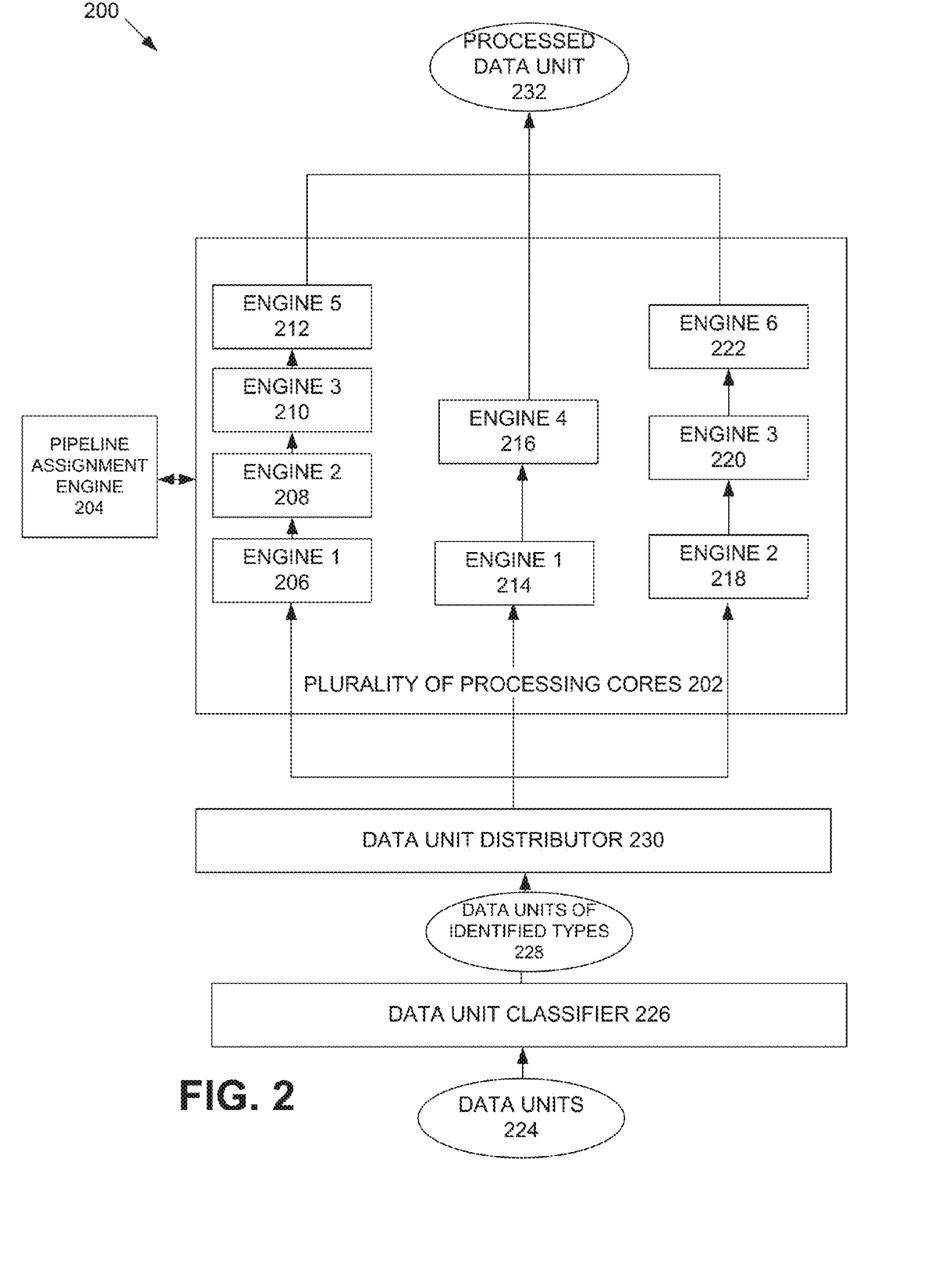
FIG. 2 is a block diagram depicting a multi-core processor architecture that includes multiple pipelines, where each pipeline is dedicated to a particular packet type.

FIG. 2 is a block diagram depicting a multi-core processor architecture that includes multiple pipelines, where each pipeline is dedicated to a particular packet type. The architecture 200 includes a plurality of processing cores 202 that is configurable for assignment of individual cores into one of a plurality of pipelines. In one embodiment of the disclosure, the plurality of processing cores 202 is a "sea of processors" architecture containing an array of serially connected processors. In one embodiment the processing cores/engines 206-222 are each programmable general processors. Alternatively, each of the processing cores/engines 206-222 respectively are dedicated ASIC engines that are configured to perform a specific processing operation. A pipeline assignment engine 204 interacts with the plurality of processing cores 202 to selectively assign the processing cores 202 to individual pipelines based on processing requirements for a particular pipeline, and/or to configure each of the processing cores 202 to perform a particular operation, such as by loading an executable program.

In the example of FIG. 2, three types of data units are expected to be received. A first type of data unit is configured to have a first operation, a second operation, a third operation, and a fifth operation performed upon it. A second type of data unit is configured to have the first operation and a fourth operation performed upon it, and a third type of data unit is configured to have the second operation, the third operation, and a sixth operation performed on it. Because the plurality of processing cores 202 includes sufficient processing cores for each of the types of data units expected to have its own dedicated pipeline, the pipeline assignment engine assigns four processing cores 206, 208, 210, 212 to a first pipeline, two processing cores 214, 216 to a second pipeline, and three processing cores 218, 220, 222 to a third pipeline. The pipeline assignment engine 204 further directs that the processing cores, which have been assigned to particular pipelines, be configured to perform particular operations. Thus, the first processing core 206 of the first pipeline is configured to perform operation 1, the second processing core 208 of the first pipeline is configured to perform operation 2, the third processing core 210 of the first pipeline is configured to perform operation 3, and the fourth processing core 212 of the first pipeline is configured to perform operation 5. The processing cores of the second and third pipelines are similarly configured so as to be ready to process data units distributed to those pipelines.

An expected average data unit processing time is computed based on the assignment of processing cores by the pipeline assignment engine. In configurations where each operation performed by each processing core takes one cycle of time to complete, and data units are expected to be uniformly distributed across the different types, the expected average data unit processing time is equal to a sum of the number of processing cores in a pipeline times the number of types of data units assigned to that pipeline across each of the pipelines, with that sum divided by the total number of types of data units expected. In the example of FIG. 2, the expected average data unit processing time is three cycles (i.e., (4 processing cores*1 type+2 processing cores*1 type+3 processing cores*1 type)/3 total types).

In operation, data units 224 are received and classified at classifier 226 to generate data units of identified types 228. A data unit distributor 230 distributes the different types of data units 228 to different pipelines based upon the classified types of those data units. In the example of FIG. 2, the distributor 230 distributes data units of the first type to the first pipeline containing processing cores 206, 208, 210, 212, data units of the second type to the second pipeline containing processing cores 214, 216, and data units of the third type to the third pipeline containing processing cores 218, 220, 222. A pipeline of processing cores performs the necessary operations on an assigned data unit and outputs a processed data unit 232.

In the example of FIG. 2, the plurality of processing cores 202 includes sufficient processing cores to implement a dedicated pipeline for each of the expected data unit types. In some scenarios the plurality of processing cores 202 will have an insufficient number of cores to form dedicated pipelines. In such a scenario, the pipeline assignment engine 204 assigns the processing cores to pipelines that are configured to operate on more than one type of data unit. When a pipeline is assigned types of data units that have common operations to be performed on them, a processing core savings is achieved. However, non-common operations among the set of operations needed to be performed on those types of data units assigned to that pipeline increase the time processing time necessary to process data units in that pipeline. (When a data unit reaches a processing core programmed for an operation that is not to be performed on that type of data unit, the data unit is passed through to the next processing core in the pipeline for processing during the next processing cycle.) Thus, there tends to be an inverse relationship between the number of processors used and the expected time for processing a data unit.

Figure 3:
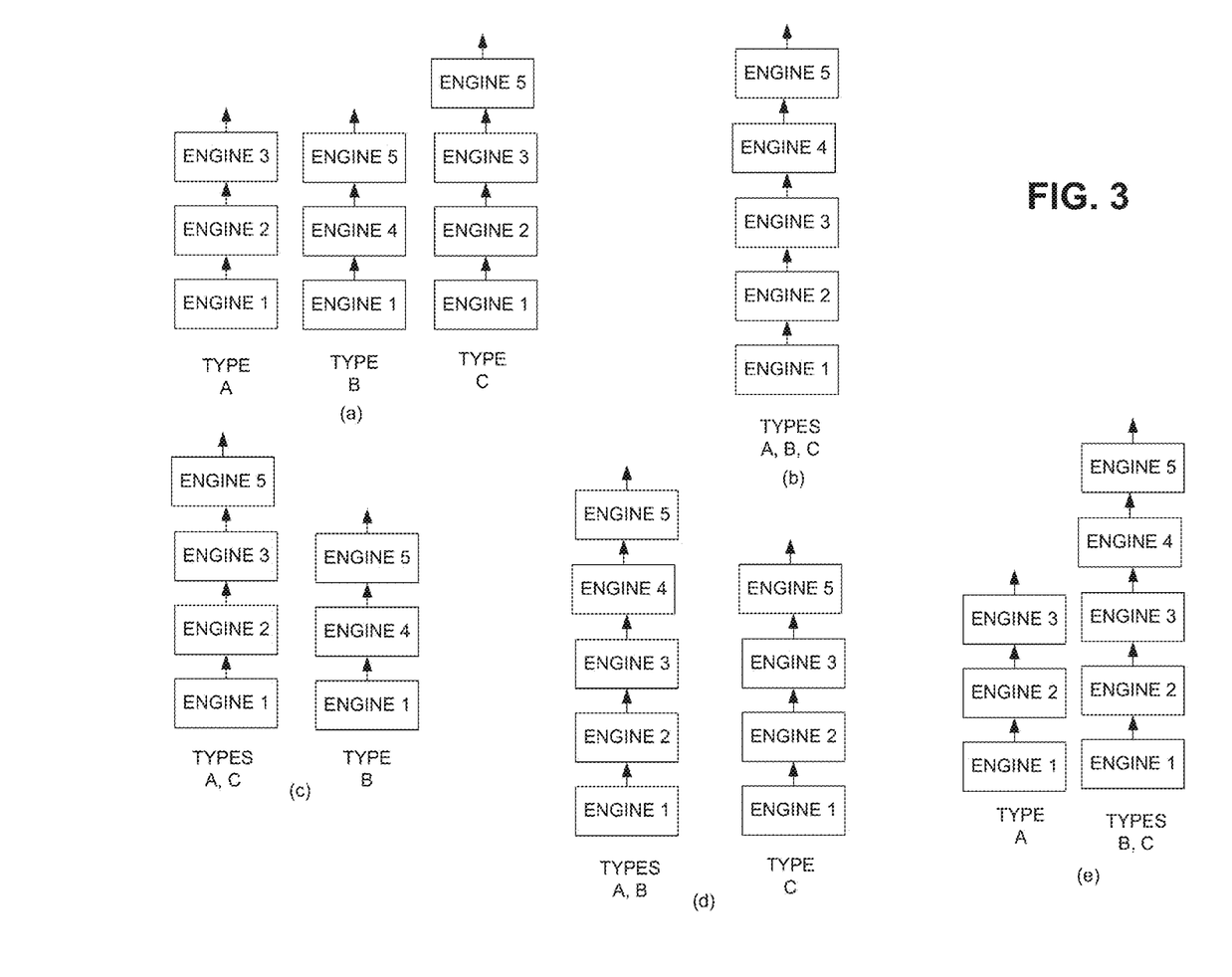
FIG. 3 provides an example of processing core-pipeline assignments that illustrates the relationship between processing cores utilized and expected time for processing data units, where longer pipelines generally indicate longer processing times.

FIG. 3 provides an example of processing core-pipeline assignments that illustrates the relationship between processing cores utilized and expected time for processing data units where longer pipelines generally indicate longer processing times. In FIG. 3, three types of data units are expected to be received. Data units of type A are to have operations 1, 2, and 3 performed upon them, data units of type B are to have operations 1, 4, and 5 performed upon them, and data units of type C are to have operations 1, 2, 3, and 5 performed upon them FIG. 3a depicts a processing core assignment where the processing cores are programmed into data unit type dedicated pipelines, where type A data units are distributed to the first pipeline, type B data units are distributed to the second pipeline, and type C data units are distributed to the third pipeline. The FIG. 3a assignment utilizes 10 processing cores, and the expected processing time for a data unit (all operations taking one processing cycle, and data units expected to be received across the different types at an even distribution) is 3.3 processing cycles.

FIG. 3b depicts a processing core assignment where the processing cores are programmed into a single pipeline that includes all operations to be performed on all of the expected types of data units. All data units of all types are assigned to the single pipeline. The FIG. 3b assignment utilizes 5 processing cores, and the expected processing time for a data unit is 5 processing cycles. The example of FIG. 3b indicates the tradeoff between processing cores utilized and expected processing time, wherein FIG. 3a, the use of 5 additional processing cores results in an expected time savings of 1.7 processing cycles/data unit.

FIGS. 3c-3e depict processing core assignments where two types of data units are assigned to one pipeline, with the third type of data unit being assigned to a second pipeline. The FIG. 3c assignment utilizes 7 processing cores with an expected processing time of 3.6 processing cycles for a data unit. The FIG. 3d assignment utilizes 9 processing cores with an expected processing time of 4.6 processing cycles for a data unit. The FIG. 3e assignment utilizes 8 processing cores with an expected processing time of 4.3 processing cycles for a data unit.

As can be seen from the example of FIG. 3, there is a trade-off between the number of processing cores utilized and the expected processing time for a data unit. While this trade-off provides some opportunity for design choice, certain of the pipeline assignment options in FIG. 3 are objectively sub-optimal.

Figure 4:
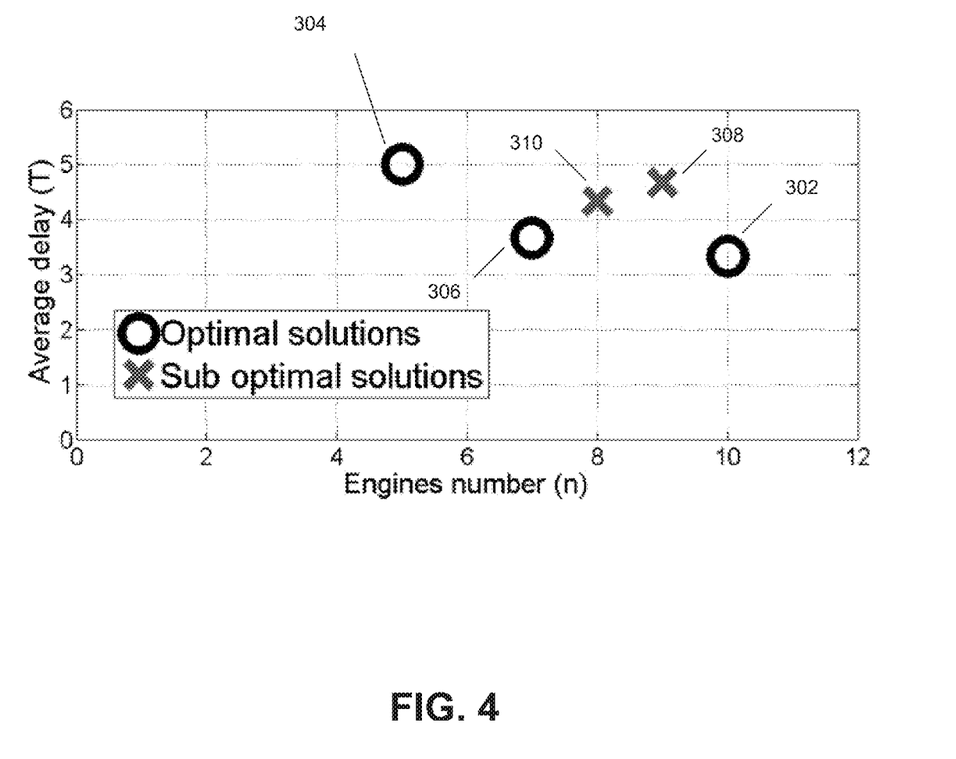
FIG. 4 is a chart that plots the number of processing cores utilized and the expected processing time for a data unit across the five pipeline assignment options of FIG. 3.

FIG. 4 is a chart that plots the number of processing cores utilized and the expected processing time for a data unit across the five pipeline assignment options of FIG. 3. In one embodiment of the disclosure, the pipeline assignment engine 204 is configured to automatically assign the processing cores 202 to respective pipelines based on the types of data units that are expected to be received by the multi-core processor based on a historic receipt type statistic. The FIG. 3a assignment is depicted at 302, the FIG. 3b assignment at 304, the FIG. 3c assignment at 306, the FIG. 3d assignment at 308, and the FIG. 3e assignment at 310. Where a first pipeline assignment's number of processing cores and expected processing time are both bested by a second pipeline assignment's number of processing cores and expected processing time (i.e., the second pipeline assignment uses less processing cores and has a faster expected processing time), the first pipeline assignment is considered to be sub-optimal because the second pipeline assignment can operate faster while using fewer processing cores. Such analysis objectively limits the number of rational design choices to the FIG. 3a assignment 302, the FIG. 3b assignment 304, and the FIG. 3c assignment at 306.

The multi-core processor described herein is implemented in a variety of contexts in different embodiments of the disclosure. In one embodiment of the disclosure, the multi-core processor is implemented as a component in a network architecture, such as in a in a bridge, router, switch or other suitable network device. In that architecture, data packets of differing types are received, where different operations are to be performed on incoming packets based on packet type. A classifier identifies a type associated with an incoming packet, and a distributor routes that packet to the proper pipeline for processing based on the classified packet type.

In one embodiment of the disclosure, a pipeline assignment engine performs pipeline definition and operation assignment based on a heuristic. The heuristic attempts to find a near-optimal solution to delineating processing cores into pipelines and assigning operations to those processing cores, while not guaranteeing an optimal solution. Following is a symbolic description of the problem contemplated by the heuristic in a network environment along with example algorithms by which the heuristic operates in different embodiments of the disclosure.

A network includes packets of k types. Each type is defined by a set of tasks that are to be performed on the packet in a given order. The distribution of the packet types (i.e. the probability of an arbitrary packet to belong to each type) is known to the pipeline assignment engine. The required tasks for the different packet types are among a set of r possible tasks $U=\{1, \ldots, r\}$. For any packet, tasks are performed in an increasing order of their representing indices. Each task is required at most once for each type. The number of tasks for each type is not fixed and can be any number in the range [1,r].

The number of available processing cores ("engines") n is given as a parameter. Each engine can serve a single task, among the set of tasks, selected by the pipeline assignment engine ("network manager"). The network manager seeks to divide the set of engines into sets (called pipelines) and to determine for each engine the single task it can serve. In one embodiment, multiple engines serve a single task across multiple pipelines.

Each packet type is distributed to a single pipeline that contains engines that serve all its required tasks, with possibly some additional engines for performing other tasks. The delay of a packet is the sum of the delays (in each of the engines) in the pipeline that serves its type. For simplicity in describing the problem, it is assumed that the delay of all engines is fixed and the delay is measured in units of this fixed delay. Thus the delay in a pipeline is simply its length (i.e., number of engines).

The network manager seeks to find a solution that minimizes the average delay of a packet for any given set of parameters. As described below, there is a tradeoff between the number of available engines and the obtained average delay. Smaller number of engines results in sharing pipelines between different packet types, causing a redundant delay in processing some packets. The following is a symbolic description of the inputs and outputs of the system.

Input:
N—number of available engines
$U=\{1, \ldots, r\}$—Set of r possible tasks
$(S_1, P_1), \ldots, (S_k, P_k)$—k pairs of the form $(S_i, P_i)$ (for $i \in [1,k]$) representing the k packet types s.t.
$S_i$—Set of tasks required by packet type i
$P_i$—Probability for a packet to belong to type i
$(S_i, P_i)$ satisfies $S_i \subseteq$ and $0 < P_i \leq 1$
Output:
A solution includes the following:
d—number of pipelines
$Q_1, \ldots, Q_d$—The set of engines in each of the d pipelines s.t. $|Q_j|=q_j$ and $n=\Sum_{j=1}^{d}(q_j) \leq N$
$B_{i,j}(t \in [1,k], j \in [1,d])$—An binary indication whether a packet of type i is served by pipeline j s.t.
$(\forall l,j)\ B_{i,j} \in [0,1]$
$(\forall t)\Sigma_{j=1}^{d}(B_{i,j})=1$ (Each packet type is served by a single pipeline)
$(\forall l,f)\ B_{i,j}=1 \rightarrow S_i \subseteq Q_j$ (The selected pipeline of a packet must serve all the packet tasks)

The average delay obtained in a solution from the above form is the weighted sum of the delay in the pipeline serving each of the packet types.

$$T=\Sigma_{i=1}^{k} P_i \cdot \Sigma_{j=1}^{d}(B_{i,j} \cdot q_j)$$

The heuristic seeks to find a solution that minimizes the average delay using the processing cores available. In one embodiment of the disclosure, the heuristic begins with an initial state, where a pipeline is allocated for each expected packet type. This configuration tends to use the maximum number of engines while offering the fastest processing of packets. Without constraints on the number of engines, the initial configuration would be selected by the heuristic. Given a smaller upper bound on the number of engines N, the heuristic merges pipelines to reduce the number of engines used, while increasing the average delay. The heuristic continues the process until a small enough number of engines is achieved.

In one embodiment, the heuristic functions as follows. In the initial state, the number of pipelines is the number of packet types and each pipeline include the required engines in the corresponding packet type. Let n be the number of engines in the current state of the pipelines. If n≤N, the current state is returned as the solution. Whenever the number of engines is too large, the heuristic selects two pipelines and merges them. The heuristic seeks to merge pairs of pipelines that best meet one or more of following criterions:

i) Large number of common engines—Any common engine can reduce the total number of engines after the merging.

ii) Small number of non-common engines—Each non-common engine in one of the pipelines in the pair increases the delay of packets that before the merging use the second pipeline.

iii) Low probability for an arbitrary packet to belong to the packet types that make use of the current pipeline—If the delay observed by a packet in a pipeline becomes larger due to the merging, it is preferable for this pipeline to be accessed less frequently in order to reduce the effect on the average delay.

Consider a pair of pipelines in an intermediate step of the algorithm. Let $A_i$ (for $i \in [1,2]$) be the set of engines in each of the two pipelines of the pair. This set of engines is the union of the engines required by the packet types served in this pipeline. Likewise, let $z_i$ be the probability of an arbitrary packet to belong to a packet type served by this pipeline (i.e., the sum of the probabilities for a packet to belong to one of the packet types served by original pipelines composing the current merged pipeline). If these pipelines are merged, the total number of engines is reduced by the number of common engines $|A_1 \cap A_2|$. This is the possible gain in such merging. The additional delay for packets previously served by the first pipeline (ratio of z of all packets) is $|A_2 \setminus A_1|$. Likewise, for packets served by the second pipeline ($z_2$ of all packets), the additional delay is $|A_1 \setminus A_2|$. Thus the expected increase in the average delay if these pipelines are merged is $z_1 \cdot |A_2 \setminus A_1| + z_2 \cdot |A_1 \setminus A_2|$. This is the possible cost. For this pair, the ratio R is defined as the ratio of the cost and the gain:

$$R = (z_1 \cdot |A_2 \setminus A_1| + z_2 \cdot |A_1 \setminus A_2|)/|A_1 \cap A_2|.$$

Informally, the ratio describes how much delay on average in units of additional delay is expected in order to reduce the number of engines by one. In each step of the algorithm the heuristic calculates this ratio for each pair of pipelines and merges the pair of pipelines with the minimal value of the ratio. This merging achieves the best possible cost vs. gain ratio.

In each iteration, the number of total number of engines is reduced. The algorithm stops when the achieved number of engines n is not greater than the upper bound of N or when all the sets of engines in all the pipelines are disjointed. In the last case, any additional merging will not reduce the total number of engines. The last state of the pipelines and the membership of packet types to pipelines is returned as the solution.

Pseudocode for implementing the above heuristic is as follows:

```
Compress_Matrix (M, index_1, index_2):
   "Goal: Summing two columns in a matrix into a
   single column. Returns a similar matrix with the
   same number of rows and with number of columns
   smaller by one. The new column is the last column
   in the new matrix.
   Parameters:
   M - a binary matrix representing for any packet type
   the pipeline it makes use of
   index_1, index_2 - indices of pipelines that are
   being merging, uniting the corresponding packet types. "
   n_rows, n_columns = dimensions(M)
   M_new = zeros (n_rows, n_columns-1)
   columns_shift = 0
   for j in [1, n_columns]:
      if ((j == index_1) or (j == index_2)):
         columns_shift = columns_shift + 1
      else:
         for i in n_rows:
            M_new[i][j - columns_shift] = M[i][j]
   for i in n_rows:
      M_new[i][n_columns-1] = M[i][index_1] + M[i][index_2]
   return M_new
Count_Engines (d, [Q_1, . . . , Q_d]):
   "Goal: Counts the number of engines in a set of pipelines.
   Parameters:
   d - number of pipelines
   [Q_1, . . . , D_d] - set of engines in each of the pipelines"
   n = 0
   for i in [1,d]:
      n = n + |Q_i|
   return n
Find_Architecture (N, r, k, [(S_1, P_1), . . . , (S_k, P_k)]):
   "Goal: Finds architecture of combined pipelines based on
   the number of available engines,
   Parameters:
   N - number of available engines
   r - numberof possible tasks
   k - number of packet types
   [(S_1, P_1), . . . , (S_k, P_k)] - k pairs representing the set of
   tasks and the probability of each packet type"
   d = k
   for i in [1,d]:
      Q_i = S_i
      z_i = P_i
   B = zeros(k, k)
   for i in [1,k]:
      B[i][i] = 1
   n = Count_Engines(d, [Q_1, . . . , Q_d])
   while (n > N):
      Best_pair = (-1,-1)
      Best_R = 0
      for i in [1,d]:
         for j in [i+1,d]:
            gain = |Q_1 ∩ Q_2|
            cost = (z_1 ·|Q_2\ Q_1| + z_2 · |Q_1\ Q_2|).
            R = gain / cost
            if (R > Best_R):
               Best_pair = (i, j)
               Best_R = 0
      if (Best_R == 0): // cannot merge any pair of pipelines
         return d, [Q_1, . . . , Q_d], B
      (i, j) = Best_pair
      Q_new = Q_i U Q_j
      z_new = z_i + z_j
      [Q_1, . . . , Q_{d-2}] = [Q_1, . . . , Q_{i-1}] U [Q_{i+1}, . . . , Q_{j-1}]
      U [Q_{j+1}, . . . , Q_d]
      d = d - 1
      Q_d = Q_new
      z_d = z_new
      n = Count_Engines(d, [Q_1, . . . , Q_d])
```

-continued

```
    B = Compress_Matrix(B, i, j)
return d, [Q₁, . . . , Q_d], B
```

In one embodiment of the disclosure, the heuristic is generalized for the case where the delay of engines serving different tasks is not fixed. However, for each task, in all the engines it is served on, the delay is fixed. Now, a pipeline can be composed of engines with different delays. In such cases, the clock time, the time it takes to complete an engine service in the pipeline, is determined according to the worst-case delay in the engines composing the pipeline. As in the homogeneous case, the total delay time of a packet served in the pipeline is the number of engines in the pipeline times the clock time.

In this scenario, before pairs are considered for merging the heuristic also considers their respective clock times. The clock time of the merged pipeline is identified as the maximum of the clock times of the two merged pipelines.

To deal with the heterogeneous case, the heuristic calculates a new cost vs. gain ratio for the merging of each pair of pipelines. For a pair of pipelines, let $C_i$ (for $i \in [1,2]$) be the clock times of the two pipelines. Let $C = \max\{C_1, C_2\}$ be the obtained clock time if these pipelines are merged. Likewise, let $A_i$ and $z_i$ be as defined above. The gain is again the number of common pipelines, the reduction in the number of engines $|A_1 \cap A_2|$. The delay in the merged pipeline is $T = C|A_1 \cup A_2|$.

The additional delay for packets previously served by the first pipeline (ratio of $z_1$ of all packets) is $T - C_1|A_1|$ and for packets from the second pipeline ($z_2$ of all packets) equals $T - C_2|A_2|$. The expected increase in the average delay if these pipelines are merged is:

$$z_1 \cdot (T - C_1|A_1|) + z_2 \cdot (T - C_2|A_2|).$$

This is the possible cost in the heterogeneous case.

The new cost vs. gain ratio that is compared for all pairs of pipelines is:

$$R = (z_1 \cdot (T - C_1|A_1|) + z_2 \cdot (T - C_2|A_2|))/|A_1 \cap A_2| = ((z_1 + z_2)$$
$$T - z_1 \cdot C_1 \cdot |_1| - z_2 C_2|A_2|)/|A_1 \cap A_2| = ((z_1 + z_2)\max\{C_1, C_2\}|A_1 \cup A_2| - z_1 \cdot C_1 \cdot |A_1| - z_2 C_2|A_2|)/|A_1 \cap A_2|.$$

In each step, the heuristic combines the pair of pipelines that minimizes this ratio.

Figure 5:
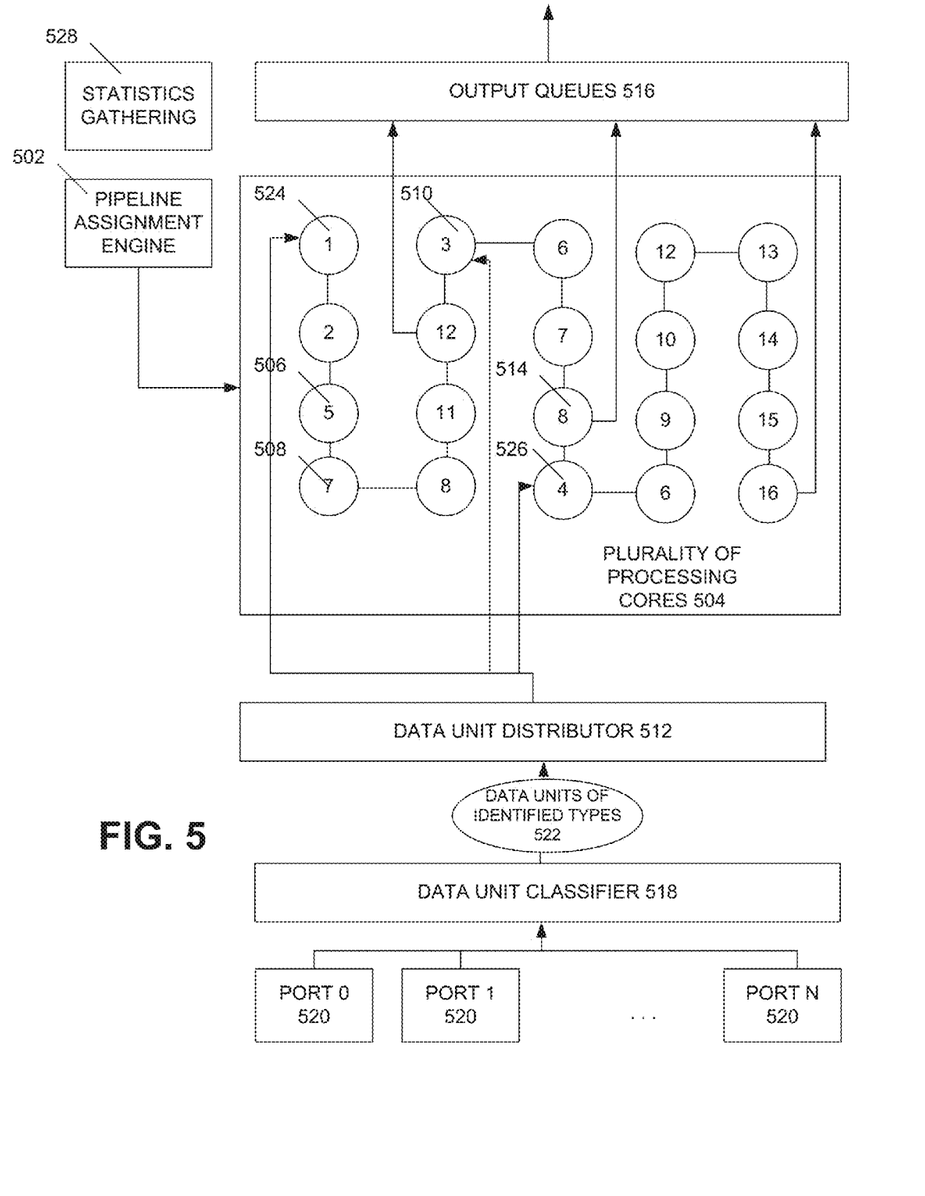
FIG. 5 is a block diagram depicting a pipeline assignment engine delineating pipelines in an array of processing cores and assigning operations to individual processing cores.

FIG. 5 is a block diagram depicting a pipeline assignment engine delineating pipelines in an array of processing cores and assigning operations to individual processing cores. A pipeline assignment engine 502 determines a desirable pipeline configuration to be implemented by the plurality of processing cores 504. The plurality of processing cores 504 are arranged as a serially connected array of processing cores, such that a result from one processing core (e.g., processing core 506) is easily passed to a next processing core (e.g., processing core 508) for processing. The processing cores 504 are configurable for performing different operations, as assigned by the pipeline assignment engine 502. The processing cores 504 are also configurable to be designated as an input processing core or an output processing core. In the example of FIG. 5, processing core 510 is designated by the pipeline assignment engine as an input processing core that receives input data from the data unit distributor 512, while processing core 514 is designated as an output processing core that outputs processed data units to an output queue 516.

In the example of FIG. 5, the pipeline assignment engine 502 has determined that 3 pipelines are to be generated. A first pipeline includes processing cores configured to perform operations 1, 2, 5, 7, 8, 11, and 12. A second pipeline includes processing cores configured to perform operations 3, 6, 7, and 8. A third pipeline includes processing cores configured to perform operations 4, 6, 9, 10, 12, 13, 14, 15, and 16. In one embodiment of the disclosure, the pipeline assignment engine 502 utilizes heuristics as described herein in determining the pipeline assignments. Such heuristics, in one embodiment, are informed by data from a statistics gathering/storing module 528. Module 528 contains data tracking system parameters such as counts of different types of data units received (e.g., historic packets received by type). The pipeline assignment engine 502 is configured to alter the assignments of the processing cores 504 based on the data, as described herein. For example, certain low frequency types of data units may have their associated pipelines be more desirable candidates for merging.

In operation, a data unit classifier 518 receives data units (e.g., packets of data) on one of a plurality of network ports 520. The data unit classifier 518 associates a type with each data unit, as indicated at 522. The typed data units are provided to the data unit distributor 512, which distributes the typed data units to one of the three pipelines (i.e., the pipeline beginning at processing core 524, processing core 510, or processing core 526) based on the type associated with the data unit. The data unit is processed through the processing cores of the pipeline to which it was assigned, and a processed data unit output is sent to an output queue 516 for downstream routing.

Figure 6:
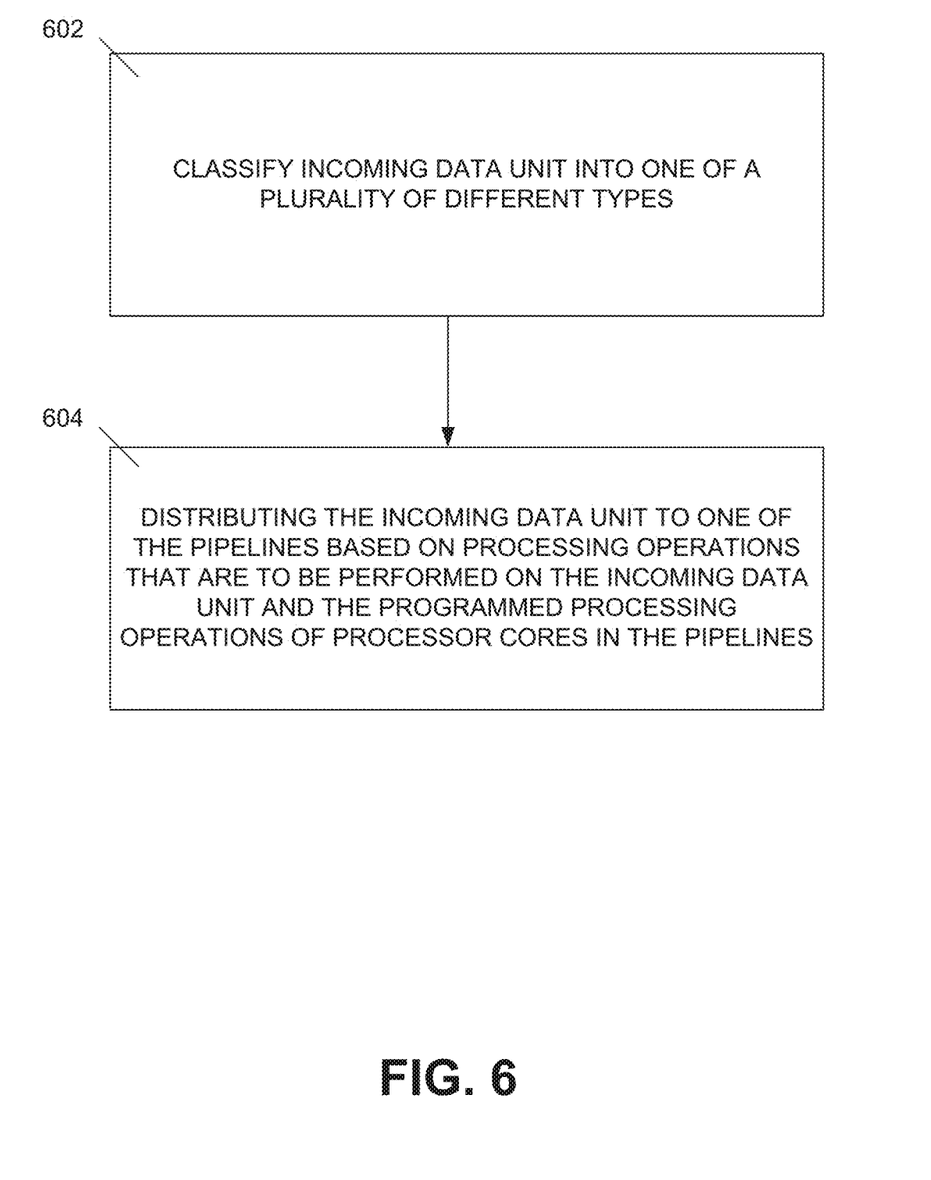
FIG. 6 is a flow diagram depicting a method of processing different types of data units using a multi-core processor.

FIG. 6 is a flow diagram depicting a method of processing different types of data units using a multi-core processor. At 602, an incoming data unit is classified into one of a plurality of different types. At 604, the incoming data unit is distributed to one of a plurality of processing pipelines comprising a plurality of connected processing cores, each processing core being selectably programmed to execute a respective processing operation, the incoming data unit being assigned based on processing operations that are to be performed on the incoming data unit and the programmed processing operations of processing cores in the pipelines.

This application uses examples to illustrate the invention. The patentable scope of the invention includes other examples.

It is claimed:

1. A multi-core processor for processing different types of data units, comprising:
   a classifier configured to classify incoming data units into different type data units;
   a plurality of processing cores that are selectably configurable into plural processing pipelines, respective processing pipelines including connected processing cores, ones of the processing cores being selectably programmed to execute a respective processing operation on a received incoming data unit, different ones of the processing pipelines defined by a selectable number of processing cores, wherein a first processing pipeline of the multi-core processor is configured to perform a first processing operation and a second processing operation on a first type of data unit, and wherein the first processing pipeline includes a first processing core configured to perform the first processing operation and a second processing core configured to perform the second processing operation; and
   a distributor configured to distribute the different types of data units to one of the pipelines among the plural pipelines at least as a function of the classified type of the data units and the programmed processing operations of processing cores in the pipelines, wherein the distributor is configured to distribute incoming data units of the first type to the first pipeline.

2. The multi-core processor of claim 1, wherein the classified type of a data unit identifies processing operations to be performed on that data unit.

3. The multi-core processor of claim 1, wherein the first pipeline includes a third processing core configured to perform a third processing operation;
wherein the first pipeline is configured not to perform the third processing operation on the first type of data unit.

4. The multi-core processor of claim 1, wherein the first pipeline is configured to perform a third processing operation and a fourth processing operation on a second type of data unit;
wherein the first pipeline includes a third processing core configured to perform the third processing operation and a fourth processing core configured to perform the fourth processing operation;
wherein the distributor is configured to distribute incoming data units of the second type to the first pipeline.

5. The multi-core processor of claim 1, wherein the first pipeline includes a first number of processing cores; and
wherein a second pipeline includes a differing number of processing cores.

6. The multi-core processor of claim 1, wherein the plurality of processing cores are serially connected in an array;
wherein the plurality of processing cores are configured to be programmatically designated as an input processing core for a processing pipeline or an output processing core for the processing pipeline.

7. A multi-core processor for processing different types of data units, comprising:
a classifier configured to classify incoming data units into different type data units;
a plurality of processing cores that are selectably configurable into plural processing pipelines, respective processing pipelines including connected processing cores, ones of the processing cores being selectably programmed to execute a respective processing operation on a received incoming data unit, different ones of the processing pipelines defined by a selectable number of processing cores;
a distributor configured to distribute the different types of data units to one of the pipelines among the plural pipelines at least as a function of the classified type of the data units and the programmed processing operations of processing cores in the pipelines; and
a pipeline assignment engine configured to assign the processing cores to respective pipelines based on the types of data units that are expected to be received by the multi-core processor based on a historic count of different types of packets.

8. The multi-core processor of claim 7, wherein the pipeline assignment engine is configured to optimize the assignment of processing cores of the plural pipelines based at least on a number of processing cores assigned to the plural pipelines and an expected multi-core processor processing time for a data unit.

9. A method of processing different types of data units using a multi-core processor, comprising:
classifying an incoming data unit into one of a plurality of different types;
distributing the incoming data unit to one of a plurality of processing pipelines comprising a plurality of connected processing cores, each processing core being selectably programmed to execute a respective processing operation, the incoming data unit being assigned based on processing operations that are to be performed on the incoming data unit and the programmed processing operations of processing cores in the pipelines,
wherein a first operation and a second operation are to be performed on the incoming data unit, and
wherein the incoming data unit is assigned to a first pipeline of processing cores based on the first pipeline including a first processing core configured to perform the first operation and a second processing core configured to perform the second operation.

10. The method of claim 9, wherein the first pipeline includes additional processing cores that are configured to perform operations that are not to be performed on the incoming data unit.

11. The method of claim 9, wherein the first pipeline includes a first number of processing cores; and
wherein the second pipeline includes a second number of processing cores that differs from the first number of processing cores.

12. The method of claim 9, further comprising:
programmatically assigning the plurality of processing cores to different pipelines, wherein each processing core is programmed to perform a processing operation on a data unit.

13. The method of claim 12, wherein programmatically assigning further comprises:
performing an optimization procedure to determine an optimal or near optimal assignment of the processing cores.

14. The method of claim 13, wherein performing the optimization procedure further comprises:
generating a preliminary assignment that includes a preliminary pipeline assignment for a pipeline that identifies a number of processing cores and a processing operation for each of the number of processing cores.

15. The method of claim 14, wherein performing the optimization procedure further comprises:
determining a total number of processing cores in the preliminary pipeline assignment for the pipeline and other preliminary pipeline assignments for other pipelines;
determining an expected delay for processing data units by the pipeline and the other pipelines; and
comparing the total number of processing cores and the expected delay for the preliminary assignment with total numbers of processing cores and expected delays for other preliminary assignments.

16. The method of claim 15, further comprising selecting one of the preliminary assignments for operation based on the comparing.

17. The method of claim 16, wherein selecting one of the preliminary assignments comprises:
eliminating one of the preliminary assignments as being non-optimal based on another preliminary assignment having a better total number of processing cores and expected delay.

18. The method of claim 15, wherein determining the expected delay comprises making the determination based on expected rates of receipt of different types of data units.

* * * * *